United States Patent [19]
Clay et al.

[11] Patent Number: 4,755,006
[45] Date of Patent: Jul. 5, 1988

[54] DYNAMIC WHEEL BALANCING DEVICE

[76] Inventors: Sean S. C. Clay, 4470 Gilbert Ave., Corona, Calif. 91719; Robert A. Clay, deceased, late of Oklahoma City, Okla., by Sean S. C. Clay, representative

[21] Appl. No.: 911,515

[22] Filed: Sep. 25, 1986

[51] Int. Cl.$^4$ ............................................. B60B 13/00
[52] U.S. Cl. ................................. 301/5 BA; 74/573 R
[58] Field of Search ..................... 74/573 R, 573 F; 301/5 B, 5 BA

[56] References Cited

U.S. PATENT DOCUMENTS

| | | | |
|---|---|---|---|
| 3,109,321 | 11/1963 | Rogers | 301/5 BA |
| 3,273,941 | 9/1966 | Skidmore | 74/573 |
| 3,376,074 | 4/1968 | Whitlock | 301/5 |
| 3,376,075 | 4/1968 | Mitchell | 301/5 |
| 3,410,154 | 11/1968 | Deakin | 301/5 BA |
| 3,427,077 | 2/1969 | Cole et al. | 301/5 |
| 4,388,841 | 6/1983 | Gamble | 301/5 BA X |
| 4,400,037 | 8/1983 | Gentry | 301/5 BA |

*Primary Examiner*—James B. Marbert
*Attorney, Agent, or Firm*—Warren F. B. Lindsley

[57] ABSTRACT

A dynamic balancing device for the wheel of a motor vehicle, the device comprising flexibly mounted weighting members which are driven outward by the increased centrifugal forces diametrically opposite the nonconcentric mass center to produce the desired balancing effect.

5 Claims, 5 Drawing Sheets

DYNAMIC WHEEL BALANCING DEVICE

BACKGROUND OF THE INVENTION

When the wheel of an automobile rotates at high speed, it is important that the wheel is properly balanced. If it is not, that is, if its center of mass does not coincide with its center of rotation, the wheel will vibrate and bounce on the pavement causing a number of undesirable effects. Such vibrations impair the proper operation of the brakes, and the steering mechanism, and they cause excessive tire wear, increased maintenance costs and driver fatigue.

The common remedy in the case of passenger cars and other vehicles is to have the wheels balanced. This is ordinarily accomplished by attaching lead weights to the rims of the wheels. Most service stations have special equipment which they employ in the determination of the required size and location of the weights needed for the balancing of a given wheel. Each time a new or repaired tire is installed on a wheel, the balancing operation must be repeated. It is also desirable to rebalance a wheel periodically to correct any imbalance that might occur due to uneven tire wear.

Because such periodic maintenance is expensive and subject to neglect, there has been a continuing interest in the development of a balancing mechanism that can be permanently attached to a wheel. Such a balancing mechanism should preferably operate continuously as the wheel rotates, providing in some way a dynamic counterbalancing effect to offset any static imbalance existing in the wheel and tire assembly.

DESCRIPTION OF THE PRIOR ART

Various dynamic balancing mechanisms or devices have been offered commercially for installation on the wheels of motor vehicles. Most such devices incorporate in some way a quantity of weighted elements that are free to distribute themselves about the rotational axis of the wheel in a manner which compensates or makes correction for an initial static imbalance.

The principle of operation of such devices has been recognized for some time. At relatively low rotational velocities, the center of rotation of the wheel is displaced in the direction of the offset mass center; at higher velocities above resonance, the wheel tends to rotate about its mass center with the axle moving in a circular path. Under the latter condition, the weighted elements incorporated in the balancing device are moved by centrifugal forces toward the side of the wheel diametrically opposite the axle from the mass center of the wheel itself. Displacement of the weighted elements in this manner tend to offset the initial imbalance of the wheel.

U.S. Pat. No. 3,376,074 issued to B. I. Whitlock describes a balancing ring in the form of a hollow toroid that is adapted to be clamped concentrically to the side of the wheel inside an annular recess in the wheel structure. The interior of the toroid is filled with a fluid such as oil, along with a number of steel balls. The diameter of the balls is sufficiently smaller than the interior diameter of the toroid to permit their free movement about the toroid as in a race. The number of balls incorporated in the device is such that when the balls are placed end-to-end inside the toroid, they extend approximately half way around its circumference. A maximum counterbalancing effect is thus achieved when all of the balls have moved to one side. In the operation of the device, the balls move toward the side of the ring that is diametrically opposite the static center of mass of the wheel and tire assembly. The weight of the balls thus offsets the initial imbalance of the wheel at high speeds, thereby reducing vibrations and other associated ill effects.

U.S. Pat. No. 3,376,075 issued to A. E. Mitchell covers a device very much like the one just described. Mitchell's device incorporates the same kind of toroid with its charge of fluid and steel balls, but the toroid is attached to one face of a flat steel disc. The steel disc has a central opening that provides clearance for the axle and it has additional holes that fit over the lug bolts on which the wheel is mounted. Installation is accomplished by mounting the disc between the brake housing and the wheel. Operation is the same as described for Whitlock's device.

U.S. Pat. No. 3,427,077 issued to D. W. Cole et al. describes a balancing device very much like Mitchell's. It employs a balancing ring that is clamped to a mounting disc intended for mounting to the wheel in the same manner. In place of the steel balls employed in the earlier patents of Whitlock and Mitchell, this device uses steel shot that moves about inside the balancing ring to correct the imbalance.

While the above described balancing mechanisms represent an improvement over the older method of attaching weights to the rim of the wheel, certain disadvantages remain. Containment of the fluid in the balancing ring over long periods of time under typical road conditions is not easily realized. Loss of the fluid or deformation of the annular ring can totally disable the device. Its operation can also be impaired by changes in the viscosity of the fluid due to aging or temperature extremes. Design measures directed toward the elimination or reduction of such problems can add significantly to the manufacturing cost.

For these reasons, the need remains for an improved dynamic balancing mechanism.

SUMMARY OF THE INVENTION

In accordance with the invention claimed, improved means are provided for the dynamic balancing of the wheels of motor vehicles, the means comprising either separate attachments to the wheel and tire assembly, or devices incorporated integrally with the tire.

It is, therefore, one object of the present invention to provide an improved means for balancing the wheels of a motor vehicle.

Another object of the invention is to provide such a means in the form of a device that is carried by the wheel and is active during the use of the vehicle.

A further object of the invention is to provide such a balancing device that is particularly effective under the high speed conditions in which it is most needed.

A still further object of the invention is to provide such a device in a durable form that is not readily degradable under conditions of severe mechanical stress or temperature extremes.

A still further object of the invention is to provide such a device in a form that may quickly and easily be mounted on the wheel or alternatively in a form that requires no separate installation.

Yet another object of the invention is to provide such a device in a form that is inexpensive to manufacture and requires no maintenance.

3

Further objects and advantages of the invention will become apparent as the following description proceeds, and the features of novelty which characterize the invention will be pointed out with particularity in the claims annexed to and forming a part of this specification.

BRIEF DESCRIPTION OF THE DRAWINGS

The present invention may be more readily described by reference to the accompanying drawings in which.

DESCRIPTION OF THE PREFERRED EMBODIMENT

Referring more particularly to the drawings by characters of reference, FIGS. 1-4 disclose in a first embodiment the dynamic balancing device 10 of the invention as installed on a wheel 11.

Figure 1:
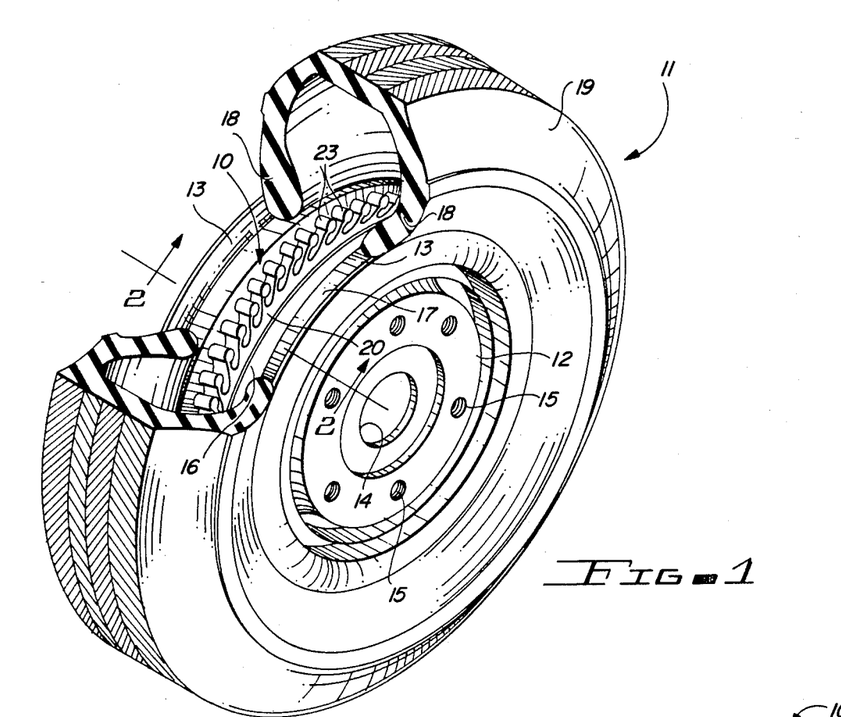
FIG. 1 is a perspective view of a motor vehicle wheel and tire assembly with part of the tire broken away to illustrate the incorporation of one form of the balancing device of the invention.
Figure 2:
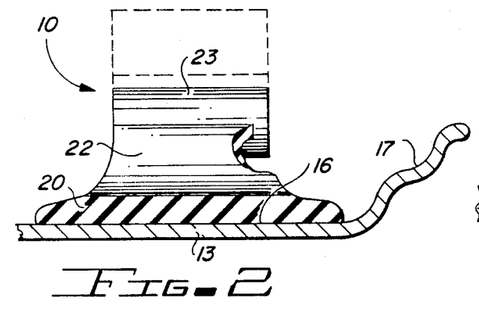
FIG. 2 is a transverse sectional view taken on line 2—2 of FIG. 1.
Figure 3:
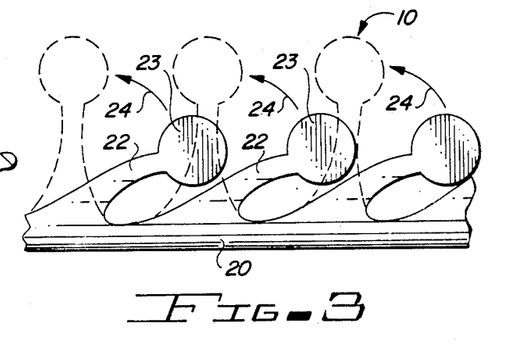
FIG. 3 is a fragmentary enlarged side elevational view showing the relative action of the projecting parts of the device when the wheel is at rest and in motion.

The wheel 11 comprises the conventional circular disc or plate portion 12 and a rim portion 13.

The disc portion 12 has a central opening 14 for the hub of the axle and it has a number of lug bolt holes 15 for use in mounting the wheel 11 to the axle and brake drum assembly.

The rim 13 is in the form of a short cylinder or ring with a flat-bottomed annular depression 16 at its center. The inside cylindrical surface of the rim 13 in the region of the depression 16 perpendicularly abuts the periphery of disc portion 12 where it is attached by welding or other means. The outer edges of rim 13 are flared to form a cross-section that curves radially outward to form an annular surface 17 for holding the beaded edge 18 of the tire 19 in a mating relationship that is rendered increasingly secure by air pressure inside the tire so that a sealing action occurs as the tire is inflated and an airtight junction is thereby realized between the beaded edge 18 of the tire and annular surface 17 of the rim.

The dynamic balancing device 10, shown in FIGS. 1, 2, 3 and 4 comprises a flat continuous band 20 of flexible material, such as a rubber or vinyl composition which may be impregnated with fabric o metal mesh to provide greater strength.

Figure 4:
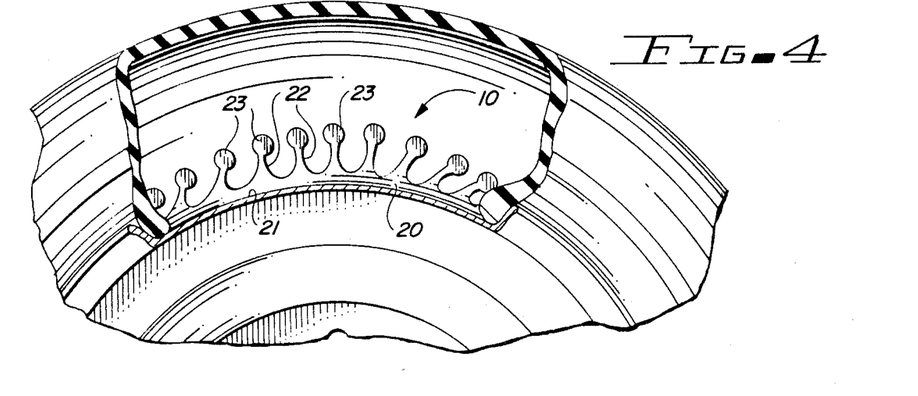
FIG. 4 is a fragmentary side elevation of the wheel and tire assembly with the tire broken away showing the relative position of the projecting parts of the device when the wheel is being rotated.

The device 10 may be fabricated in the form of a continuous band or ring having sufficient width and flexibility to be stretched over the wheel rim 13 where it may tightly position itself either across the higher outer flat portions 21 of the rim as shown in FIG. 4, or in the flat depressed portion 16 of the rim, as shown in FIGS. 1 and 2. Alternatively, it may be fabricated in the form of a flat strip of sufficient length and width to surround either the circumference of the depression 16 or that of the flat raised portions 21 of the rim, wherein or whereon it may be cemented or otherwise secured to form a continuous band around the rim.

The flat continuous band 20 is provided with a plurality of integral flexible appendages or webs 22, which extend transversely across the width of the band and are provided at their extreme outer ends with integral, cylindrically-shaped, heavy outer end portions 23 which also extend transversely across the width of the web. The webs 22 with their integral end portions 23 are adapted to normally position themselves in tangent clockwise relation around the band 21 when the vehicle wheel 11 is not rotating, and to move upwardly and outwardly as indicated by the arrows 24 in FIG. 3, under the centrifugal force resulting from the rotation of the wheel when the associated vehicle is in motion.

In accordance with the principles described earlier in connection with the discussion of prior art dynamic balancing devices, if the static mass center of the wheel and tire assembly does not coincide with the geometric center of the wheel and with its intended axis of rotation, the centrifugal forces acting on the end portions 23 of device 10 will be greatest for those end portions 23 which are diametrically opposite the axle from the static mass center. The diametrically opposite end portions 23 will, therefore, be caused to extend farthest from the axis of rotation. The additional extension of these end portions has the effect of moving the mass center closer to the axis of rotation, thereby reducing vibrations and their associated ill effects.

It should be noted that the degree of balancing effect provided by the heavy cylindrical end portions 23 is limited by the length of the flexible web portions 22 and by the weights of these portions. It is evident, however, that this limitation may be overcome by increasing the length and stiffness of the webs while increasing the weight of the cylindrical end portions 23. The additional weight may be provided in the form of imbedded metals such as steel or lead.

Figures 5, 6, 7, 8:
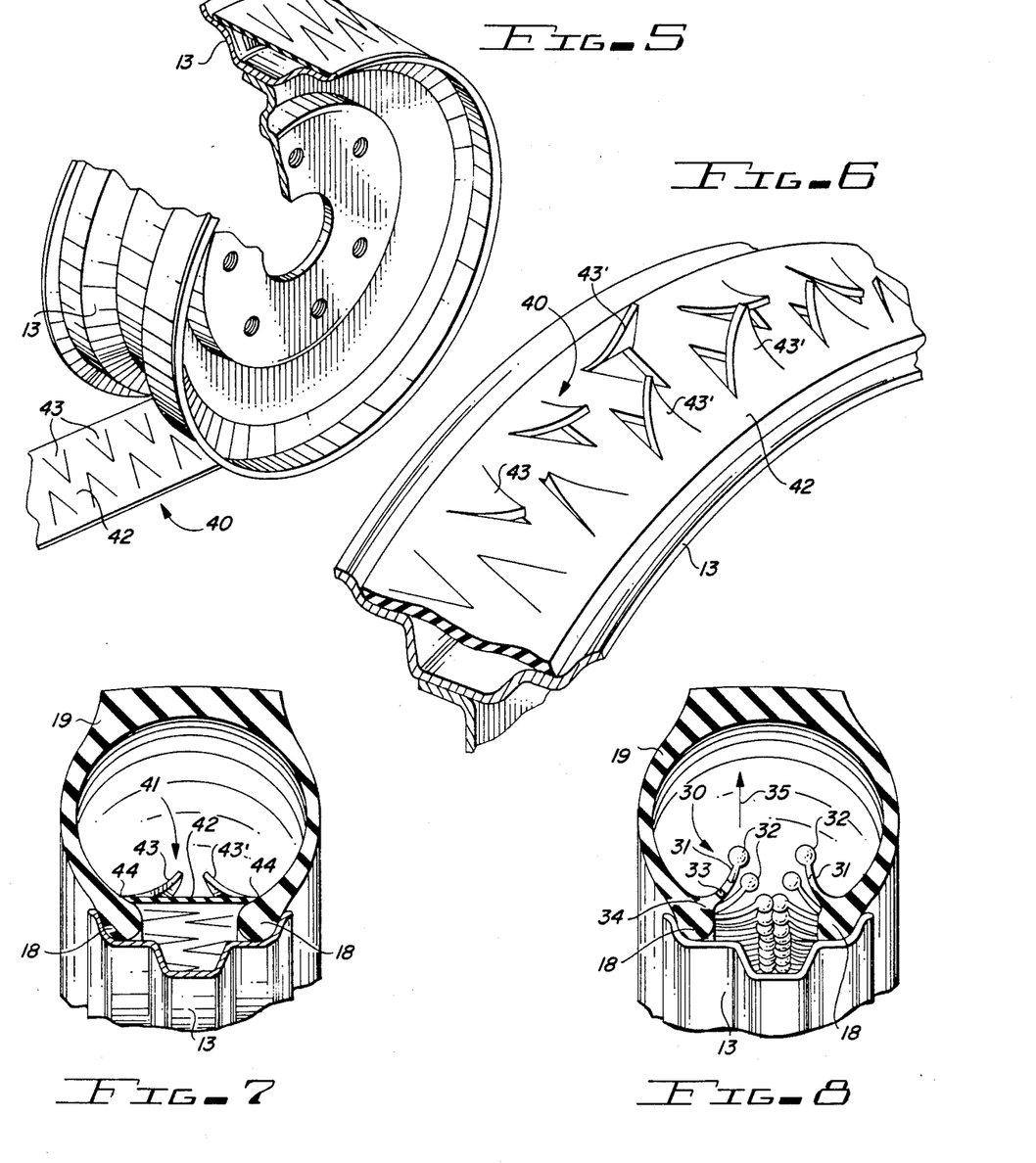
FIG. 5 is a perspective view of a motor vehicle wheel, partly in section and broken away, illustrating the application of a modified form of the device being applied to the wheel rim.
FIG. 6 is an enlarged fragmentary perspective and sectional view showing the relative positioning of the flexible projections when the wheel is rotating and the device subjected to centrifugal forces.
FIG. 7 is a transverse sectional view of a modified version of the balancing device of the invention showing the form of the device illustrated in FIG. 6, applied as an integral part of the vehicle tire.
FIG. 8 is a transverse sectional view showing a variation of the form of the device illustrated in FIG. 1, applied as an integral part of the vehicle tire.

A modified version of the balancing device described in the foregoing paragraphs is shown in FIG. 8, while the balancing means 30 of FIG. 8 operates on the same principles as the device 10 of FIGS. 1-4. The separate device 10 is here replaced by an appendage or, more accurately, by a multiplicity of appendages 31 which comprise the means 30.

Each appendage 31 comprises a weighted end portion 32 attached at the extremity of a web portion 33. Each web portion 33 is attached at its base 34 to an inside edge of the tire 19 at a point near the bead 18. The weighted end portion 32 may in this case more appropriately take a spherical rather than a cylindrical form.

A closely spaced row of appendages 31 extends about each beaded edge 18 of the tire 19. Again, when the wheel is not rotating, the appendages 31 take an unstressed position in which the weighted end portions 32 lie near the rim 13. During rotation, the centrifugal force produced by rotation and, in particular, the reinforced centrifugal force appearing diametrically opposite the mass center causes the weighted end portions to move radially outward in the direction indicated by the arrow 35, producing, thereby, the desired dynamic balancing effect.

FIGS. 5-7 show another variation of the dynamic balancing device of the invention. The variation of FIGS. 5-7 may again be implemented in either of two forms including the separate balancing band 40 of FIGS. 5 and 6, and the integral balancing band 41 of FIG. 7.

In each case, the band 40 or 41 comprises a reinforced flexible web 42 which is pierced to form a multiplicity of pointed or triangular tabs 43. Each tab is cut along two sides of its triangular form. The uncut third side serves as a flexible hinge. In the preferred embodiment of this variation as shown in the drawing, two rows of the tabs 43, 43' are provided, each row being aligned with and positioned along one of the two edges of the web 42 with the pointed extremities of the tabs 43, 43' directed inwardly toward the center of the web 42. Such an orientation of the tabs produces a minimal reduction in the strength of the web 42.

As in the case of the previously described device 10, the band 40 may take the form of a continuous elastic band that holds itself in place over the rim 13 of the wheel or it may be cut from a long strip as suggested by FIG. 5 and cemented to the rim 13. The alternative of providing the band 41 as an integral part of the tire 19 is illustrated in FIG. 7 where the edges 44 of the web 42 are fused into or otherwise attached to the inside edges of the tire adjacent the bead 18.

In the operation of the balancing bands 40 and 41, the pointed ends of the tabs move from their static positions shown in FIG. 6, where they lie flush with the surface of the web 42, toward the outwardly deflected positions shown in FIGS. 6 and 7 under the centrifugal forces active during rotation. In the area opposite the static mass center, the exaggerated deflection of the tabs 43, 43' occurs to correct the imbalance of the wheel.

Figures 9, 10:
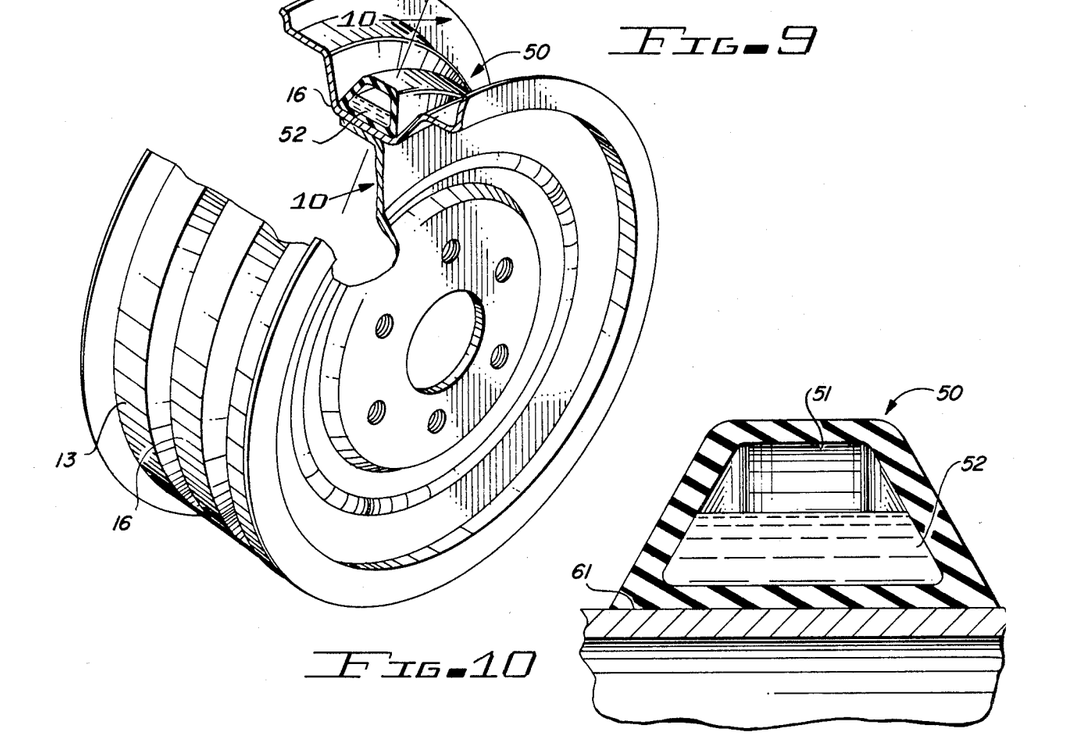
FIG. 9 is a perspective view of a motor vehicle wheel, partly in section and broken away, illustrating the application of another modified form of the balancing device applied to the wheel rim.
FIG. 10 is an enlarged fragmentary transverse sectional view through the wheel rim and balancing device shown in FIG. 9.
Figure 11:
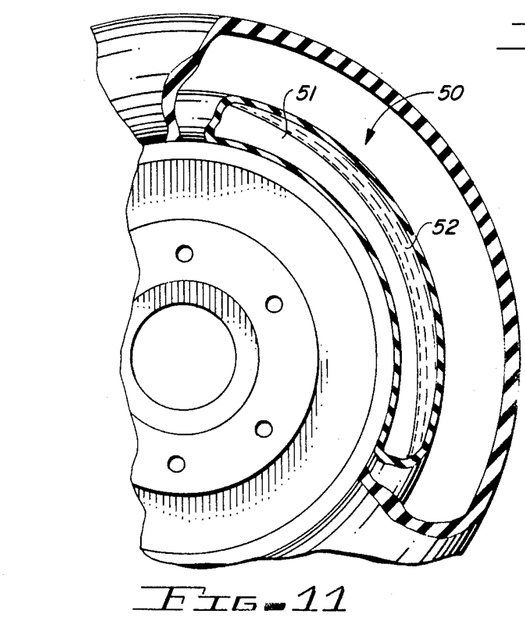
FIG. 11 is a fragmentary side elevational view, partly broken away and in section, showing the tire installed on the wheel rim, surrounding the balancing device as shown in FIGS. 9 and 10.

FIGS. 9, 10 and 11 show another variation of the invention in the form of a balancing tube 50. The tube 50 comprises a hollow reservoir 51 partially filled with a viscous fluid 52. The tube 50 is preferably somewhat flexible and fabricated of rubber, vinyl or similar material that is impervious to the fluid 52.

The continuous circular tube 50 including the partially filled liquid reservoir 51 is adapted to be stretched over the rim 13 of the wheel and allowed to position itself in the depressed or valley portion 16 of the rim and to tightly adhere to the flat bottom surface of the valley portion of the rim 13.

The balancing action of the tube 50 occurs as the fluid 52 is moved under the action of unbalanced centrifugal forces toward the side of the wheel opposite the mass center. A fluid concentration of this nature is suggested in FIG. 11 where the fluid 52 is driven to the outside surface of the reservoir 51 and is confined to a limited region therein, the unbalanced centrifugal force causing the body of fluid to take the shape of a crescent. Again, the fluid concentration opposite the mass center produces the desired balancing effect.

Figure 12:
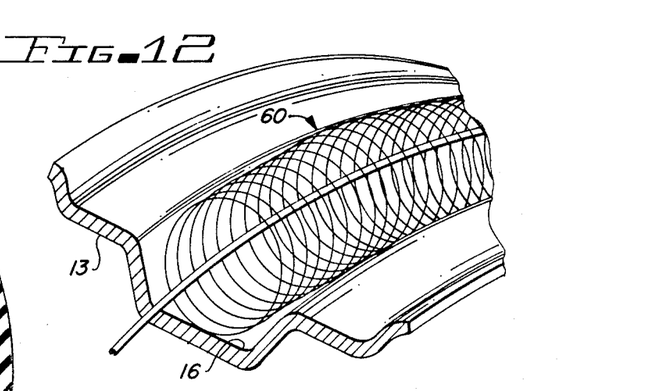
FIG. 12 is a fragmentary transverse section through a wheel rim showing still another modified form of the balancing device of the invention as applied to the wheel of a motor vehicle.
Figure 13:
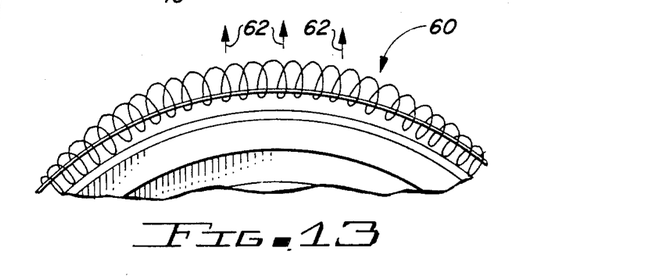
FIG. 13 is a fragmentary elevational view of the wheel rim and balancing device shown in FIG. 12, illustrating the action of the device when the wheel is being rotated and the device subjected to centrifugal forces.

FIGS. 12 and 13 show another variation of the invention in the form of a dynamic balancing spring 60. The spring 60 is a continuous coil spring that is dimensioned to fit snugly about the rim 13 when positioned in the valley or depression 16. A stout band or wire 61 passes through the center of spring 60 and is continuous thereabout, the band 61 serving to constrain the maximum deflection of the spring 60 from the surface of the rim 13.

In the operation of the balancing spring 60 the concentration of centrifugal force opposite the mass center as indicated by the arrows 62 of FIG. 13 produces two responses from the spring 60. The first response is the moving together of the coils of the spring toward the location of the force concentration; the second response is the rising of the spring 60 away from the surface of the rim 13 in the same location. Both responses contribute toward the desired balancing effect.

The variations of the invention described thus far are not well suited for application with the types of wheel and tire assemblies commonly found on large trucks or with similar wheel types such as those known as "Mag Wheels", which are often used on sports cars. Inner tubes which are commonly used on such wheels occupy the space required for mounting the balancing devices of FIGS. 1–13. A modified balancing device is thus required for wheels of this type.

Figure 14:
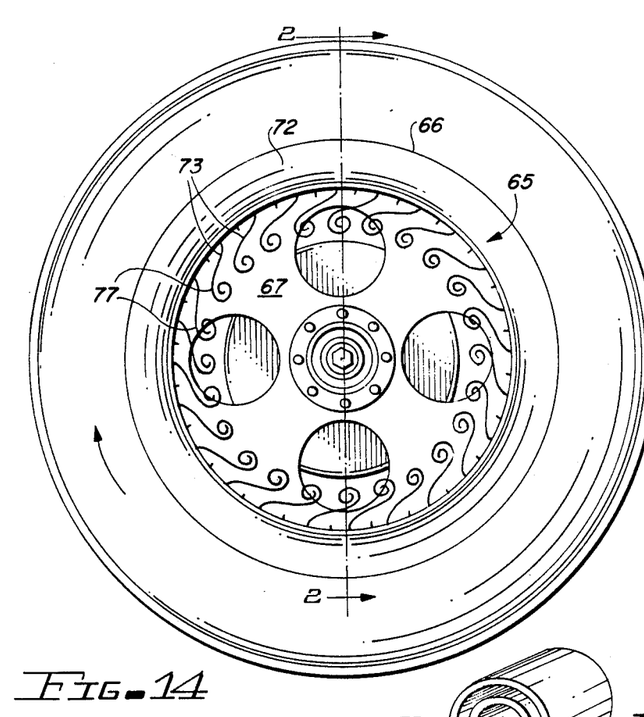
FIG. 14 is a side elevational view of a truck or mag wheel and tire combination illustrating still another form of the balancing device of the invention incorporated in the wheel itself.
Figure 15:
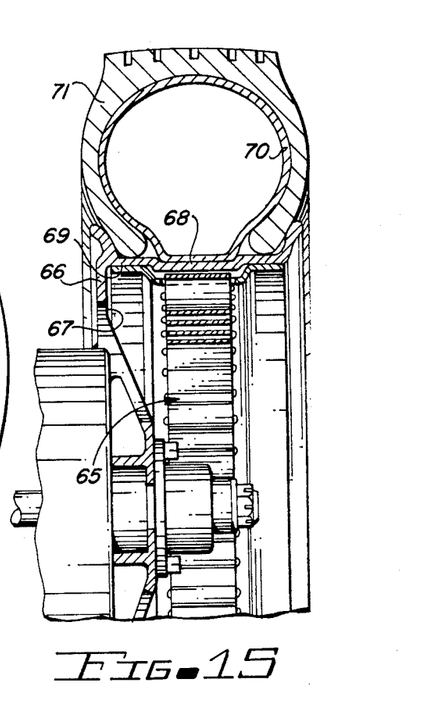
FIG. 15 is an enlarged, fragmentary transverse radial section taken on the line 15—15 of FIG. 14 illustrating the association of the balancing device with such a wheel.

FIGS. 14–17 show a further variation of the invention in the form of a balancing band 65 that is specifically intended for application with a truck wheel or a "Mag Wheel", the typical contours of which are most clearly shown in FIG. 15. In contrast to the nearly centered position of the disc portion 12 inside the rim 13 of the wheel 11 described earlier, the truck wheel 66 as shown in FIG. 15 has a disc portion 67 that is substantially offset inside the rim 68. The offset position of the disc portion 67 toward the truck side of the wheel 66 leaves an open unobstructed, generally cylindrical surface 69 at the outside of the wheel inside the rim 68. The surface 69 is employed as the mounting surface for the balancing band 65. As indicated in an earlier paragraph, an inner tube 70 is typically employed inside the tire 71.

Figure 16:
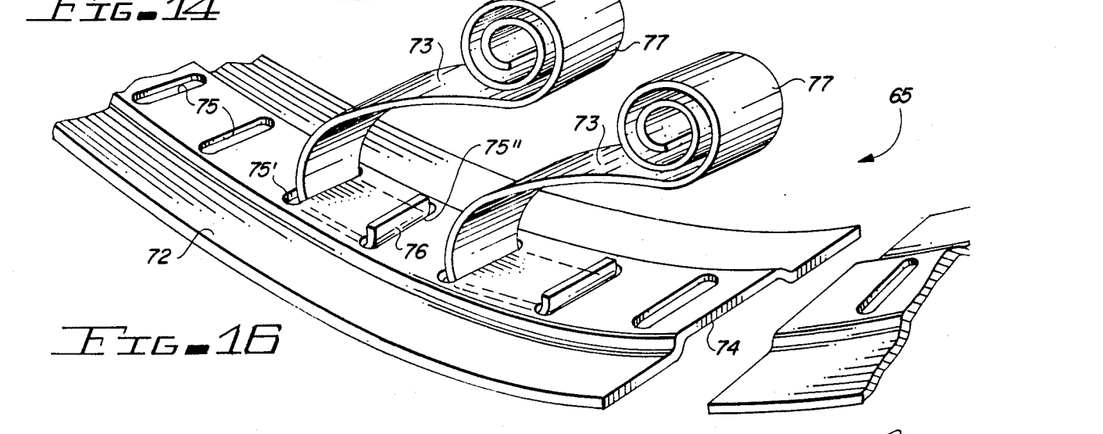
FIG. 16 is a fragmentary perspective view showing one method of attaching the flexible web and weight components of the device and their respective assembled relation to a flexible split ring before its assembly installation in the truck or mag wheel of the vehicle.

FIGS. 14 and 16 show most clearly the balancing band 65 which comprises a split ring or band 72 and a multiplicity of coiled weighting straps 73.

The band 72 is formed from a generally flat strip of metal with a centered elevated portion 74 that extends longitudinally over its length. The elevated portion 74 is pierced by transverse slots 75 that are uniformly spaced at close intervals, the slots 75 serving as mounting holes for the weighting straps 73.

The weighting straps 73 are made from flat strips of metal or plastic of sufficient strength, flexibility and resilience to serve as coiled springs. As shown in FIG. 16, the mounting end of the strap 73 passes through one of the slots 75' then bends sharply to follow the shallow channel formed under the elevated portion 74 of band 72. At the next slot 75", it bends upward at a right angle to pass through slot 75". The right angle bend at slot 75" is made a very short distance from the end of the strip so that a short tab 76 is formed which serves to secure the end of the strap 73 to the band 72. Above the point at which the strap 73 passes through the first slot 75', the strap curves upward and then to the right until it has passed over the top of tab 76, whereupon it curls sharply in the opposite direction to form a rather tight coil 77. The strap 73 with its coil 77 thus forms a flexible weighting element that tends to lean over toward the band 72.

Each successive pair of slots 75 holds such a weighting strap 73, all of which lean over in the same direction toward the band 72.

Figure 17:
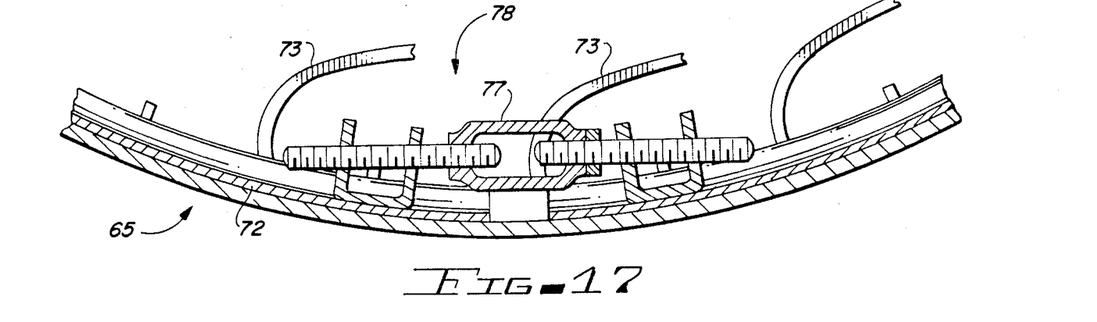
FIG. 17 is an enlarged fragmentary circumferential sectional view through one of the outside flat portions of the flexible split ring illustrating one method or means for adjusting the diameter of the assembled balancing device relative to the diameter of the wheel in which it is installed.
Figure 18:
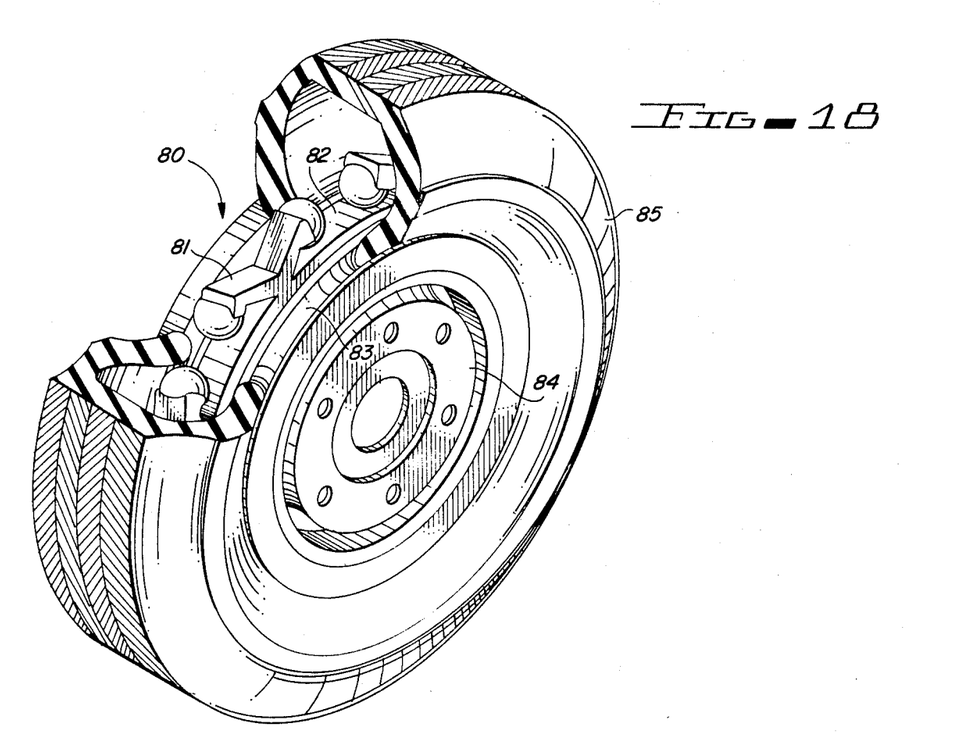
FIG. 18 is a perspective view of a wheel with the tire shown partially cut away to reveal the structure of yet another embodiment of the dynamic balancing device of the invention.

The band 72 is preformed into a split ring in an arc approximately the circle of the rim 69 of wheel 66. At the point of closure, the ends of the split ring are coupled together by a turnbuckle 78 as shown in FIG. 17.

To install the balancing band 65 in the wheel 66, the turnbuckle 78 is first adjusted to draw the ends of the band 65 together so that the outside diameter of the band 65 is somewhat smaller than the inside diameter of the rim 68. The band 65 is then placed inside the rim 68 and the turnbuckle 78 is adjusted in the opposite direction to increase the diameter of the band until it fits snugly and securely inside the rim. Alternative mounting means are not to be excluded. It is possible, for example, to employ an interference fit between a closed band and the rim. Alternatively, the band might be cemented in place or secured by screws or clamps.

The balancing band 65 operates in the manner described for the other versions of the invention. As shown in FIG. 14, the rotation of the wheel produces centrifugal forces which act on the weighting straps 73 to drive them outward toward the rim 68. As in the other versions of the invention, a nonconcentric mass center will produce an imbalanced centrifugal force pattern about the wheel that peaks under high speeds at a point diametrically opposite the mass concentration. At this point, the coils 77 are driven closer to the rim 68 to offset the static imbalance of the wheel.

The coil 77 formed at the end of the weighting strap 73 enhances the balancing capability of the band 65 by virtue of its tendancy to unwind under particularly heavy centrifugal forces, thereby allowing a greater part of its total mass to move outward toward the rim of the wheel.

FIGS. 18–21 illustrate a refinement of the balancing devices of FIGS. 1–13, the nature of the refinement being directed toward improved manufacturability and increased mechanical durability of the device.

The dynamic balancing device 80 of FIGS. 18–21 comprises a number of weighted balancing elements 81 spaced about the outer surface of a flexible band 82. The device 80 is intended to be mounted over the rim 83 of the wheel 84 inside the tire 85 in a manner similar to the mounting described for the device of FIGS. 1–4.

Figures 19, 20, 21:
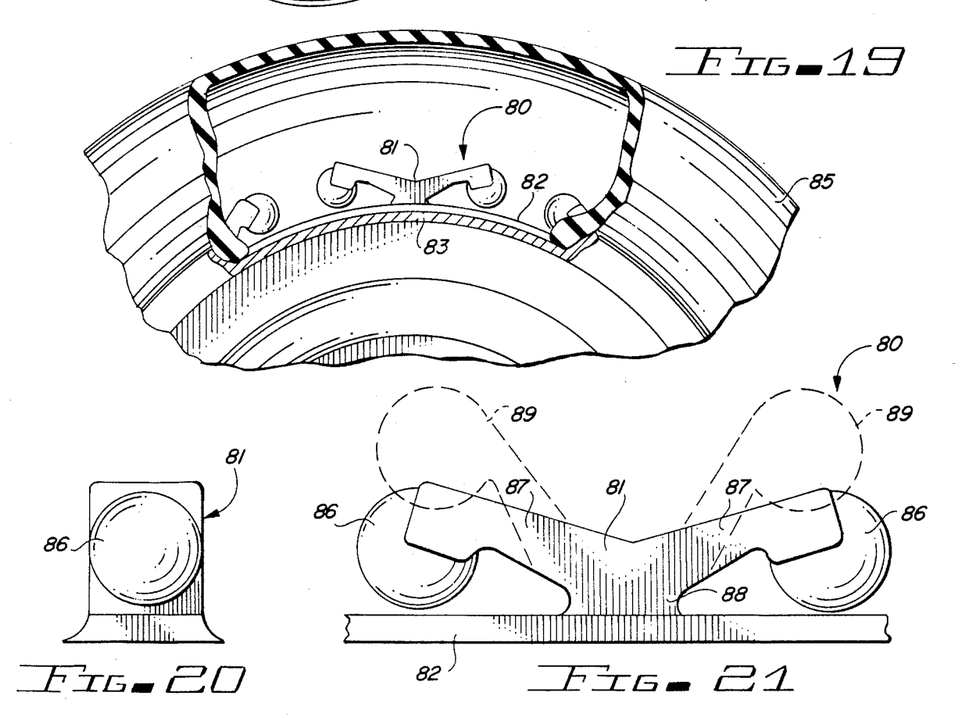
FIG. 19 is a partially cut away side view of the wheel and balancing device of FIG. 18.
FIG. 20 is an end view of the balancing element incorporated in the device of FIGS. 18 and 19.
FIG. 21 is a side view of the element of FIG. 20 showing its stressed and unstressed positions.

Each of the elements 81 comprises a pair of weighted spherical balls 86 supported at the ends of two flexible arms 87 which extend in opposite directions from a central trunk 88. The base of the trunk 88 is secured to or integral with the top surface of the band 82. In the preferred geometry of the element 81, the balls 86 extend somewhat downward from the ends of the arms 87 and the arms 87 are, therefore, tilted somewhat upward from their attachment at the trunk 88 to permit the underside of the ball 86 to clear the surface of the band 82.

The elements 81 and the band 82 are preferably molded or formed as a single integral unit of a material identical or similar to the natural or synthetic rubber from which automobile tires are made. It may be found desirable to employ some form of webbing for reinforcement. Metal weights may also be incorporated inside the balls 86.

As in the case of the similar devices described earlier, the device may be held in place over the rim by means of its own resilience and flexibility or it may be cemented in place.

The element 81 responds to centrifugal forces experienced during the rotation of the wheel by deflecting as indicated by the broken line image of FIG. 21, wherein the balls 86 are moved outward away from the band 82. The greater the centrifugal force at the location of a given element, the greater will be the deflection of the balls 86. Again, the balancing action results from the increased deflection of the balls at the location diametrically opposite the static mass center.

The relatively rugged structure of the device 80, and the comparative simplicity of its form and structure provide the basis for its expected low cost and long operating life.

An improved dynamic balancing device is thus provided in a number of variations, and although but a few embodiments have been illustrated and described, it will be apparent to those skilled in the art that various additional changes and modifications may be made therein without departing from the spirit of the invention, or from the scope of the appended claims.

What is claimed is:

1. A dynamic wheel balancer for mounting on a motor vehicle wheel between fits hub opening and a tire mounted on a rim of the wheel comprising:

a dynamic ring-shaped balancing means carried by said wheel in concentric relationship to its hub opening, said means comprising a flat continuous band of flexible material stretched over the rim of the wheel, said band being provided with a plurality of identical appendages equally spaced around the length of said band, and each of said appendages having an identical enlarged head portion at the end of the appendage, said head portion comprising a cylindrical body extending transversely across said band in a parallel arrangement with each head portion on the other of said appendages, the head portion upon rotation of the wheel displacing radially of the hub opening of the wheel toward the side of the wheel diametrically opposite the hub opening from the mass center of the wheel to offset the initial imbalance of the wheel.

2. A dynamic wheel balancer for mounting on a motor vehicle wheel between its hub opening and a tire mounted on a rim of the wheel comprising:

a dynamic ring-shaped balancing means carried by said wheel in concentric relationship to its hub opening, said means comprising a continuous member carried by the rim of the wheel, said member being provided with a plurality of identical appendages equally spaced around the length of said member, and each of said appendages having an identical enlarged head portion at the end of the appendage, said head portion comprising a rounded body extending along said band in a parallel arrangement with each head portion on the other of said appendages.

3. A dynamic wheel balancer for mounting on a motor vehicle wheel between its hub opening and a tire mounted on a rim of the wheel comprising:

a dynamic ring-shaped balancing means carried by said wheel in concentric relationsip to its hub opening, said means comprising a flat continuous band positioned over the rim of the wheel, said band being provided with a plurality of identical appendages equally spaced around the length of said band, and each of said appendages comprising a strap of metal, the free end of which is coiled in a common direction to form a spring which unwinds to offset the initial imbalance of the wheel, each spring upon rotation of the wheel displacing radially of the hub opening of the wheel toward the side of the wheel diametrically opposite the hub opening from the mass center of the wheel to offset the initial imbalance of the wheel.

4. A dynamic wheel balancer or mounting on a motor vehicle wheel between its hub opening and a tire mounted on a rim of the wheel comprising:

a dynamic ring-shaped balancing means carried by said wheel in concentric relationship to its hub opening, said means comprising a mass in the form of a continuous member surrounding said hub opening, said mass upon rotation of the wheel displacing radially of the hub opening of the wheel toward the side of the wheel diametrically opposite the hub opening from the mass center of the wheel to offset the initial imbalance of the wheel, said means comprising a coil spring the length of which extends around the rim of the wheel in a closed circular configuration, and an endless band of wire arranged to extend through the center of said coil spring to constrain the maximum deflection of said coil spring from the surface of said rim.

5. A dynamic wheel balancer for mounting on a motor vehicle wheel between its hub opening and a tire mounted on a rim of the wheel comprising:

a dynamic ring-shaped balancing means carried by said wheel in concentric relationship to its hub opening, said means comprising a mass in the form of a continuous member surrounding said hub opening, said mass upon rotation of the wheel displacing radially of the hub opening of the wheel toward the side of the wheel diametrically opposite the hub opening from the mass center of the wheel to offset the initial imbalance of the wheel, said balancing means being carried by the inside periphery of the rim, and adjustment means for adjustably securihg said member to the inside periphery of the rim of the wheel.

* * * * *

UNITED STATES PATENT OFFICE
CERTIFICATE OF CORRECTION

Patent No. 4,755,006      Dated July 5, 1988

Inventor(s) Sean S. C. Clay

It is certified that error appears in the above-identified patent and that said Letters Patent are hereby corrected as shown below:

Claim 1, line 2, delete "fits" and substitute ---its---

Claim 4, line 1, delete "or" and substitute ---for---

Claim 5, line 16, delete "securihg" and substitute

---securing---

Signed and Sealed this

Sixth Day of December, 1988

*Attest:*

DONALD J. QUIGG

*Attesting Officer*     *Commissioner of Patents and Trademarks*